United States Patent
Li et al.

(10) Patent No.: US 11,471,825 B2
(45) Date of Patent: Oct. 18, 2022

(54) MEMBRANE ABSORPTION PROCESS FOR $CO_2$ CAPTURE

(71) Applicant: GAS TECHNOLOGY INSTITUTE, Des Plaines, IL (US)

(72) Inventors: Shiguang Li, Mount Prospect, IL (US); Travis Pyrzynski, Elgin, IL (US); Howard Meyer, Hoffman Estates, IL (US); Naomi Klinghoffer, Chicago, IL (US); Timothy Tamale, Schaumburg, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 756 days.

(21) Appl. No.: 16/353,079

(22) Filed: Mar. 14, 2019

(65) Prior Publication Data

US 2019/0282953 A1    Sep. 19, 2019

Related U.S. Application Data

(60) Provisional application No. 62/642,864, filed on Mar. 14, 2018.

(51) Int. Cl.
*B01D 53/22* (2006.01)
*B01D 69/08* (2006.01)
*B01D 53/96* (2006.01)

(52) U.S. Cl.
CPC ......... *B01D 53/228* (2013.01); *B01D 53/229* (2013.01); *B01D 53/96* (2013.01);
(Continued)

(58) Field of Classification Search
CPC ............... B01D 69/08; B01D 2257/504; B01D 53/228; B01D 2325/20; B01D 53/229;
(Continued)

(56) References Cited

U.S. PATENT DOCUMENTS 4,127,625 A * 11/1978 Arisaka .................. B01D 69/08
                                                                210/500.29
5,753,009 A * 5/1998 Sirkar .................... B01D 53/22
                                                                95/45

(Continued)

OTHER PUBLICATIONS

U.S. Patent Office, English language version of the International Search Report, Form PCT/ISA/210 for International Application PCT/US2019/22270, dated Jun. 5, 2019 (1 page).
(Continued)

*Primary Examiner* — Anthony R Shumate
(74) *Attorney, Agent, or Firm* — Pauley Erickson & Swanson

(57) ABSTRACT

Processes and systems for the capture of $CO_2$ from a $CO_2$-containing gas stream are provided. The $CO_2$-containing gas stream is passed to a membrane contactor absorber wherein the $CO_2$-containing gas contacts or passes a first side of a membrane element while a $CO_2$ selective solvent with a viscosity between 0.2 and 7 cP contacts, passes or flows on second side of the membrane, opposed to the first side. The $CO_2$ permeates through the hollow fiber membrane pores and is chemically absorbed into the solvent.

9 Claims, 4 Drawing Sheets

(52) U.S. Cl.
CPC ........ *B01D 69/08* (2013.01); *B01D 2252/204* (2013.01); *B01D 2252/2025* (2013.01); *B01D 2252/504* (2013.01); *B01D 2257/504* (2013.01); *B01D 2325/20* (2013.01)

(58) Field of Classification Search
CPC .............. B01D 53/96; B01D 2252/204; B01D 2252/504; B01D 2252/2025
See application file for complete search history.

(56) References Cited

U.S. PATENT DOCUMENTS

| | | | |
|---|---|---|---|
| 5,832,712 | A | 11/1998 | Ronning et al. |
| 6,228,145 | B1 | 5/2001 | Falk-Pedersen et al. |
| 10,576,413 | B2* | 3/2020 | Novek ............... B01D 53/1475 |
| 10,799,829 | B2* | 10/2020 | Novek ............... B01D 53/1493 |
| 2009/0156875 | A1* | 6/2009 | Tomioka ................. C10L 3/102 96/5 |
| 2009/0193970 | A1* | 8/2009 | Iijima .................. B01D 61/147 95/186 |
| 2009/0277328 | A1* | 11/2009 | Wijmans ................ B01D 53/22 95/51 |
| 2011/0008229 | A1* | 1/2011 | Iyengar ................. C01B 17/167 423/229 |
| 2012/0111192 | A1* | 5/2012 | Nazarko ............. B01D 53/229 95/51 |
| 2012/0240764 | A1* | 9/2012 | Kim ....................... B01D 53/62 95/65 |
| 2014/0309471 | A1 | 10/2014 | Zhou et al. |
| 2015/0273390 | A1* | 10/2015 | Yeom .................. B01D 53/229 96/8 |
| 2015/0274524 | A1* | 10/2015 | Fedorov .................... C01B 3/38 422/187 |
| 2016/0001197 | A1* | 1/2016 | Hagerman ............. B01D 3/148 203/87 |
| 2016/0121260 | A1* | 5/2016 | Hirata .................... B01D 65/02 210/636 |
| 2017/0182469 | A1* | 6/2017 | Mochizuki ............. B01D 69/02 |
| 2018/0169594 | A1* | 6/2018 | Kurishita ........... B01D 67/0002 |
| 2018/0272275 | A1* | 9/2018 | Kawazuishi .............. C10L 3/10 |
| 2018/0272292 | A1* | 9/2018 | Mochizuki ........... B01D 67/009 |
| 2020/0164306 | A1* | 5/2020 | Laroche ............... B01D 53/266 |

OTHER PUBLICATIONS

U.S. Patent Office, English language version of the Written Opinion of the International Searching Authority, Form PCT/ISA/237 for International Application PCT/US2019/22270, dated Jun. 5, 2019 (6 pages).
Feron et al., "$CO_2$ separation with polyolefin membrane contactors and dedicated absorption liquids: performances and prospects," Elsevier Science B.V., Separation and Purification Technology, Nov. 16, 2001, pp. 231-242.
Arachchige et al., "Viscosities of Pure and Aqueous Solutions of Monoethanolamine (MEA), Diethanolamine (DEA) and N-Methyldiethanolamine (MDEA)," Telemark University College, Annual Transactions of the Nordic Rheology Society, vol. 21, 2013, pp. 299-306.
Khalilpour et al., "Membrane-based carbon capture from flue gas: a review," Elsevier Ltd., Journal of Cleaner Production, Oct. 16, 2014, pp. 286-300.
"Existing Plants, Emissions and Capture—Setting Water—Energy R&D Program Goals," National Energy Technology Laboratory, U.S. Department of Energy, May 8, 2009, 21 pages.
Amo et al., "Pilot Testing of a Membrane System for Post-Combustion $CO_2$ Capture DE-FE0005795," Membrane Technology & Research, NETL $CO_2$ Capture Technology Meeting, Jul. 31, 2014, 21 pages.
Ho, "Novel $CO_2$—Selective Membranes for $CO_2$ Capture from <1% $CO_2$ Sources DE-FE0026919," William G. Lowrie Department of Chemicals & Biomolecular Engineering Department of Materials Science and Engineering the Ohio State University, 2017 NETL $CO_2$ Capture Technology Project Review Meeting Pittsburgh, PA, Aug. 21-25, 2017, 24 pages.
Freeman, "Bench-Scale Development of a Hybrid Membrane-Absorption $CO_2$ Capture Process," Membrane Technology & Research, Inc., 2014 NETL $CO_2$ Capture Technology Meeting Pittsburgh, PA, Jul. 31, 2014, 17 pages.
Caro et al., "Zeolite membranes—Recent developments and progress," Elsevier, Microporous and Mesoporous Materials, Mar. 6, 2008, pp. 215-233.

* cited by examiner

Diagram of membrane absorption.

$CO_2$ removal rate, flue gas flow rate, and $CO_2$ inlet and outlet concentrations as functions of duration for a membrane absorption testing using a 50 wt. % aMDEA solvent.

Solvent viscosity as a function of temperature.

Run chronology for a single 8-inch diameter module at NCCC.

Solvent saturation loading as a function of temperature.

MEMBRANE ABSORPTION PROCESS FOR CO₂ CAPTURE

CROSS REFERENCE TO RELATED APPLICATION

This application also claims the benefit of U.S. Provisional Patent Application, Ser. No. 62/642,864, filed on 14 Mar. 2018. This co-pending Provisional Application is hereby incorporated by reference herein in its entirety and is made a part hereof, including but not limited to those portions which specifically appear hereinafter.

STATEMENT REGARDING FEDERALLY SPONSORED RESEARCH OR DEVELOPMENT

This invention was made with government support under grant DE-FE0012829 awarded by the Department of Energy. The government has certain rights in the invention.

BACKGROUND OF THE INVENTION

Field of the Invention

This invention relates generally to the separation and/or capture of $CO_2$ such as resulting from power plant operation from and, more particularly, to such $CO_2$ separation and/or capture via membrane contactor absorption.

Description of Related Art

Existing technology, products, systems and methods previously used or currently available to address $CO_2$ produced or resulting from power plant operation and such as may be present in power plant flue gases include:

Amine absorption—Amine absorption is the current DOE and industry benchmark technology for separation and/or capture of $CO_2$ from power plant flue gases and natural gases.

DOE/NETL systems analysis studies estimate that using chemical absorption with an aqueous monoethanolamine system to capture 90% of the $CO_2$ from flue gas will require an increase in the levelized cost of energy (LCOE) services of 75-85%. These values are well above the 2020 DOE NETL Sequestration Program post-combustion capture goal of 90% capture in existing plants with less than 35% increase in LCOE. Therefore, it is important to develop new advanced $CO_2$ capture technologies in order to maintain the cost-effectiveness of U.S. coal-fired power generation.

Conventional Gas Separation Membrane Process—Membrane Technology and Research (MTR) has developed a gas separation membrane, Polaris™, which has exhibited pure-gas $CO_2$ permeance of about 1,650 GPU at 50° C. with an ideal selectivity (ratio of single gas permeances) of about 50 for $CO_2/N_2$.

Ho et al. at Ohio State University (OSU) have disclosed zeolite/polymer composite membranes containing amine cover layer for $CO_2$ capture. The scaled membranes showed selectivities of 140 for binary $CO_2/N_2$ mixtures.

Hybrid Solvent/Membrane Process—University of Kentucky is developing an absorption solvent/membrane hybrid process. The absorption cycle uses aqueous ammonium and some typical alkyl amines. A T-type hydrophilic zeolite membrane is placed between the absorption and regeneration steps to reject water allowing a more concentrated solution to be sent to the regenerator.

The University of Texas at Austin is developing a hybrid piperazine solvent/Polaris™ membranes process for $CO_2$ capture. They reported that a hybrid series configuration requires a minimum of 70% removal by amine process, whereas a hybrid parallel configuration requires a minimum of 53% to 65% of the flue gas directed to the amine absorber.

Other Membrane Contactor Systems—Membrane contactor systems have been reported for $CO_2$ capture from flue gas. However, technical hurdles in long-term stability had to be overcome, as well as cost. Liquid side concentration polarization is one the issues that affect the long-term stability.

The $CO_2$ concentration profile in the membrane contactor is shown in FIG. 1. $C_g$, $C_{gm}$, $C_{ml}$, $C_{lm}$ and $C_l$ are the $CO_2$ concentration in the gas phase, at the gas-membrane interface, at the membrane-liquid interface, at the liquid-membrane interface and in the liquid, respectively.

The $CO_2$ mass transfer coefficient for a gas-liquid membrane absorption process can be expressed as follows:

$$\frac{1}{K} = \frac{1}{k_g} + \frac{1}{k_m} + \frac{H_{adim}}{E \cdot k_l} \qquad (1)$$

where K is the overall mass transfer coefficient [cm/s], $k_g$ the mass transfer coefficient in the gas phase [cm/s], $k_m$ the mass transfer coefficient in the membrane [cm/s], $k_l$ the mass transfer coefficient in the liquid phase [cm/s], $H_{adim}$ the non-dimensional Henry's constant, and E the enhancement factor due to chemical reaction. The overall resistance to $CO_2$ transport and the overall mass transfer coefficient have an inverse relationship. Equation 1 shows the overall resistance comes from three parts: in the gas phase, in the membrane, and in the liquid phase.

SUMMARY OF THE INVENTION

One aspect of the subject invention regards a membrane absorption process for $CO_2$ capture. In accordance with one embodiment, a process for $CO_2$ capture involves passing a $CO_2$-containing gas stream to a membrane contactor absorber wherein the $CO_2$-containing gas contacts or passes a first side of a membrane element while a $CO_2$ selective solvent with a viscosity between 0.2 and 7 cP contacts, passes or flows on second side of the membrane, opposed to the first side. The $CO_2$ permeates through the hollow fiber membrane pores and is chemically absorbed into the solvent. The $CO_2$-rich solvent can be desirably regenerated and returned or recycled to the membrane contactor absorber.

Another aspect of the invention regards a method for improving separation of $CO_2$ from a $CO_2$-containing gas stream via membrane processing is provided. A method for improving separation of $CO_2$ from a $CO_2$-containing gas stream via membrane processing in accordance with one embodiment of the invention wherein the $CO_2$-containing gas stream contacts a first side of a membrane element and a $CO_2$ selective solvent is in flow communication with a second side of the membrane element, the second side of the membrane element being opposed to the first side and wherein $CO_2$ permeates through the membrane element and is chemically absorbed into the $CO_2$ selective solvent, the improvement involves adjusting the $CO_2$ selective solvent to have a viscosity in a range between 0.2 and 7 cP.

Another aspect of the invention regards a system for capturing $CO_2$ from a $CO_2$-containing gas stream. In accordance with one embodiment, such a system includes a membrane contactor absorber as well as a desorber. The membrane contactor absorber contains a membrane element. The $CO_2$-containing gas stream contacts a first side of the membrane element and a $CO_2$ selective solvent is in flow communication with a second side of the membrane element. The second side of the membrane element is opposite or opposed to the first side. The $CO_2$ selective solvent desirably has a viscosity between 0.2 and 7 cP. The $CO_2$ permeates through the membrane element and is chemically absorbed into the $CO_2$ selective solvent to form a $CO_2$-rich solvent. The desorber accepts the $CO_2$-rich solvent from the membrane contactor absorber to remove $CO_2$ from the $CO_2$-rich solvent to form a regenerated solvent. The system further includes a return line to forward the regenerated solvent to the membrane contact absorber.

Other objects and advantages will be apparent to those skilled in the art from the following detailed description taken in conjunction with the appended claims and drawings.

BRIEF DESCRIPTION OF THE DRAWINGS

Objects and features of this invention will be better understood from the following description taken in conjunction with the drawings, wherein.

DETAILED DESCRIPTION

Figure 1:
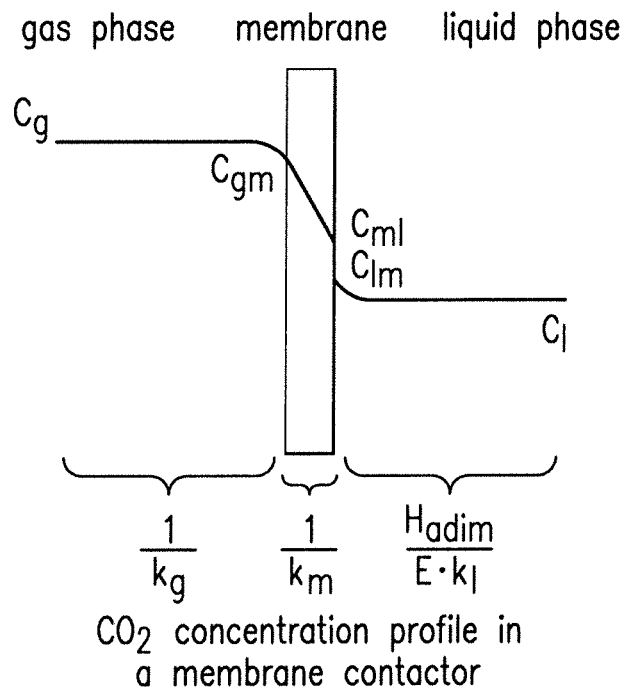
FIG. 1 is a diagram presenting the $CO_2$ concentration profile in a membrane contactor.
Figure 2:
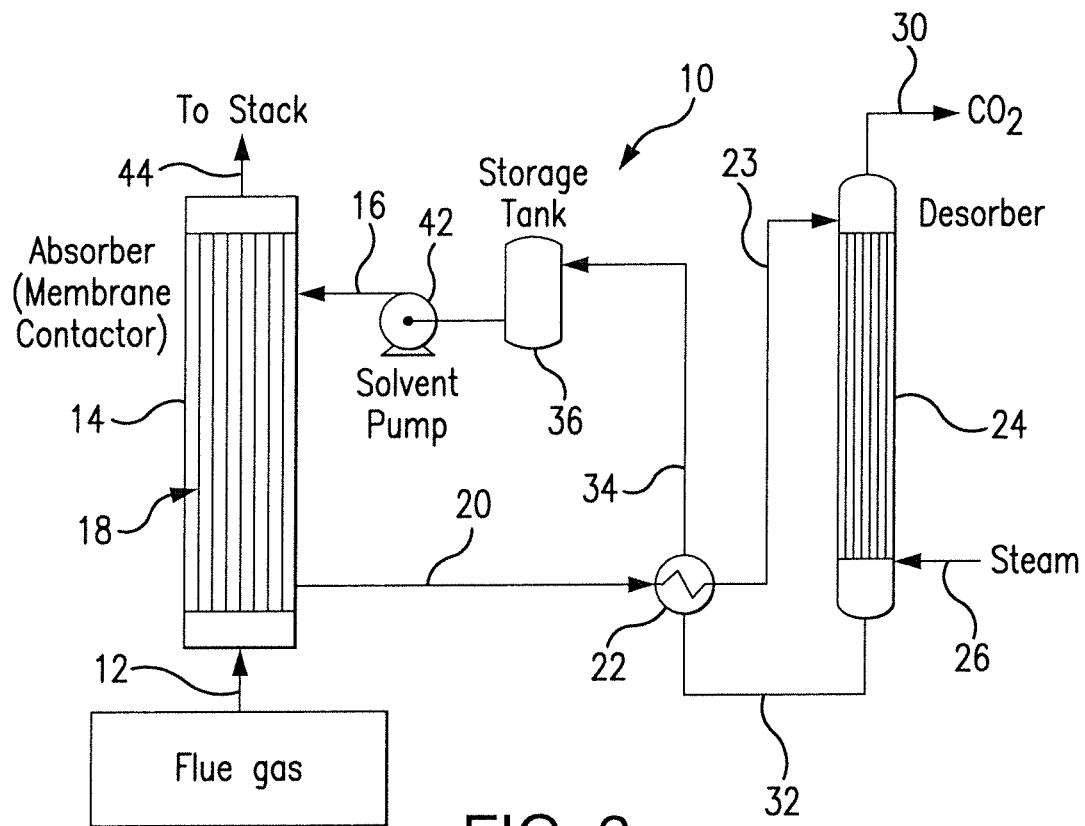
FIG. 2 is a simplified flow diagram of a system for the capture $CO_2$ from a $CO_2$-containing gas stream in accordance with one embodiment of the invention.

FIG. 2 illustrates a system, generally designated by the reference numeral 10, for the capture of $CO_2$ from a $CO_2$-containing gas stream in accordance with one embodiment of the invention.

As shown, a $CO_2$-containing gas stream 12 is passed to or introduced into an absorber such as a membrane contactor absorber 14. While the broader practice of the invention is not necessarily limited by or to the source of the $CO_2$-containing gas stream, the invention is believed to have particular applicability to or in practice with $CO_2$-containing flue gas streams such as produced or resulting in or from power plant operation such as natural gas-fired power plant operation or coal-fired power plant operation and in particular coal-fired power plant operation based on or utilizing pulverized coal.

A $CO_2$ selective solvent, such as in or as a stream 16, is also passed to or introduced into the membrane contactor absorber 14 such as containing or including a membrane element 18 such as more specifically illustrated and described below making reference to FIG. 3.

While the broader practice of the invention is not necessarily limited by or to operation with specific solvent materials, useful solvents for use in the practice of the invention include amines and promoted carbonate solvents, such as known in the art.

In the membrane contactor absorber, gas is on one side of the membrane element and liquid is on the opposed or other side of the membrane element. If desired or required, a super-hydrophobicity coating layer can be suitably applied on or to the surface of the membrane to ensure that the membrane does not wet out upon or when in contact with the liquid. For flue gas $CO_2$ separation and capture, $CO_2$ permeates through the membrane and reacts with the solvent, whereas $N_2$ does not react and has low solubility in the solvent. Thus, high $CO_2/N_2$ selectivity can be achieved. Solvent liquid typically passes on the membrane side in direct contact with the super-hydrophobicity layer and the $CO_2$-containing gas passes on the other side of the membrane. In other words, if the super-hydrophobicity coating layer is on the inside surface of a tubular membrane, then the solvent liquid would desirably be passed on the bore side of the membrane and the $CO_2$-containing gas would desirably be passed on the shell side of the membrane; if the super-hydrophobicity coating layer is on the outside surface of a tubular membrane, then the solvent liquid would desirably be passed on the shell side of the membrane and the $CO_2$-containing gas would desirably be passed on or through the bore side of the membrane.

In such operation, the gas velocity in the fiber is desirably in a range of 1-30 m/s and the liquid velocity in the module unit is desirably in a range of 0.001-0.010 m/s.

As further detailed below, $CO_2$ permeates through the membrane element and is chemically absorbed into the $CO_2$ selective solvent to form a $CO_2$-rich solvent. A $CO_2$-rich solvent stream 20 is passed from the membrane contactor absorber 14 and, such as after appropriate heat exchange processing in or via a heat exchanger 22, forming a stream 23, is forwarded to a desorber 24 for desorption of $CO_2$ and hence regeneration of the $CO_2$ selective solvent. For example, a desorbent such as steam can be introduced in or to the desorber 24 such as via a stream 26. The desorbed $CO_2$ is shown as leaving the desorber 24 as a stream 30 for subsequent use or sequestration, as may be desired. The regenerated $CO_2$ selective solvent is shown as leaving the desorber 24 as a stream 32.

The regenerated $CO_2$ selective solvent stream 32 is passed to the heat exchanger 22 for heat transfer communication with the $CO_2$-rich solvent stream 20 passed from the membrane contactor absorber 14 and resulting in a regenerated $CO_2$ selective solvent stream 34. The regenerated $CO_2$ selective solvent stream 34 can be passed to a $CO_2$ selective solvent storage tank 36. $CO_2$ selective solvent can be passed from the $CO_2$ selective solvent storage tank 36 and introduced into the membrane contactor absorber 14 such as in the form of the stream 16 via a solvent pump 42.

The $CO_2$-depleted gases exiting from the membrane contactor absorber 14, shown as the stream 44, can be appropriately processed as may desired such as by being passed to a stack.

Figure 3:
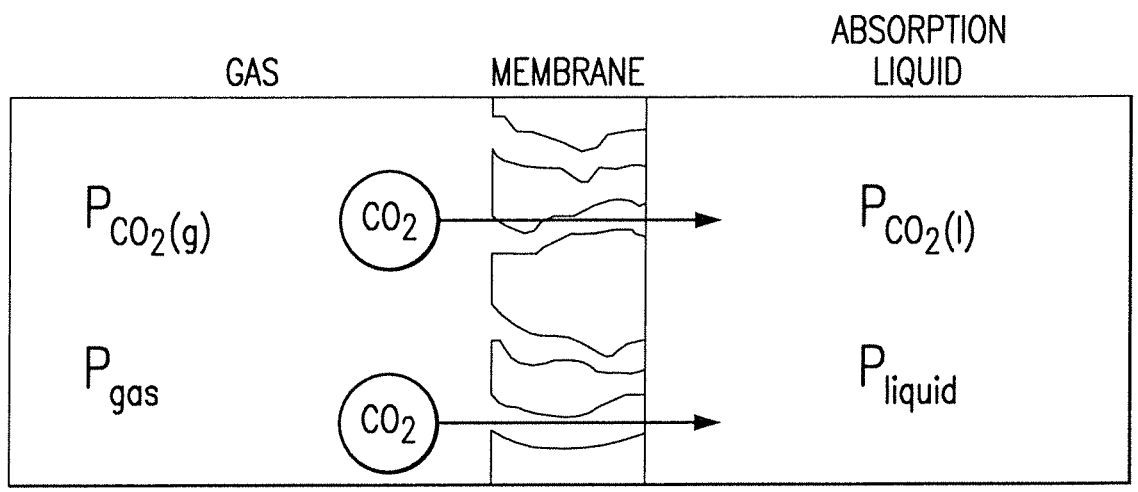
FIG. 3 is a schematic diagram of membrane absorption of $CO_2$ in accordance with one embodiment of the invention.

As shown in more specific detail in FIG. 3, $CO_2$ capture from a gas, e.g., a flue gas, can effectively and efficiently be accomplished in accordance with one embodiment of the invention by passing a $CO_2$-containing flue gas to and through one side of a membrane, e.g., the bore side of the membrane, while a chosen $CO_2$ selective solvent, e.g., an absorption liquid, flows on the other side of the membrane, e.g., the permeate side of the membrane. The $CO_2$ permeates through the hollow fiber membrane pores and is chemically absorbed into the solvent. The $CO_2$-rich solvent can be appropriately regenerated and returned or recycled to the membrane contactor absorber.

$CO_2$ selective solvents for use in the practice of the invention desirably have a viscosity of at least about 0.2 cP and up to about 7 cP, e.g., in an inclusive range of between 0.2 and 7 cP. In accordance with certain preferred embodiments, $CO_2$ selective solvents for use in the practice of the invention desirably have a viscosity of at least about 1 cP and up to about 5 cP, e.g., in a range of between 1 and 5 cP.

Figure 4:
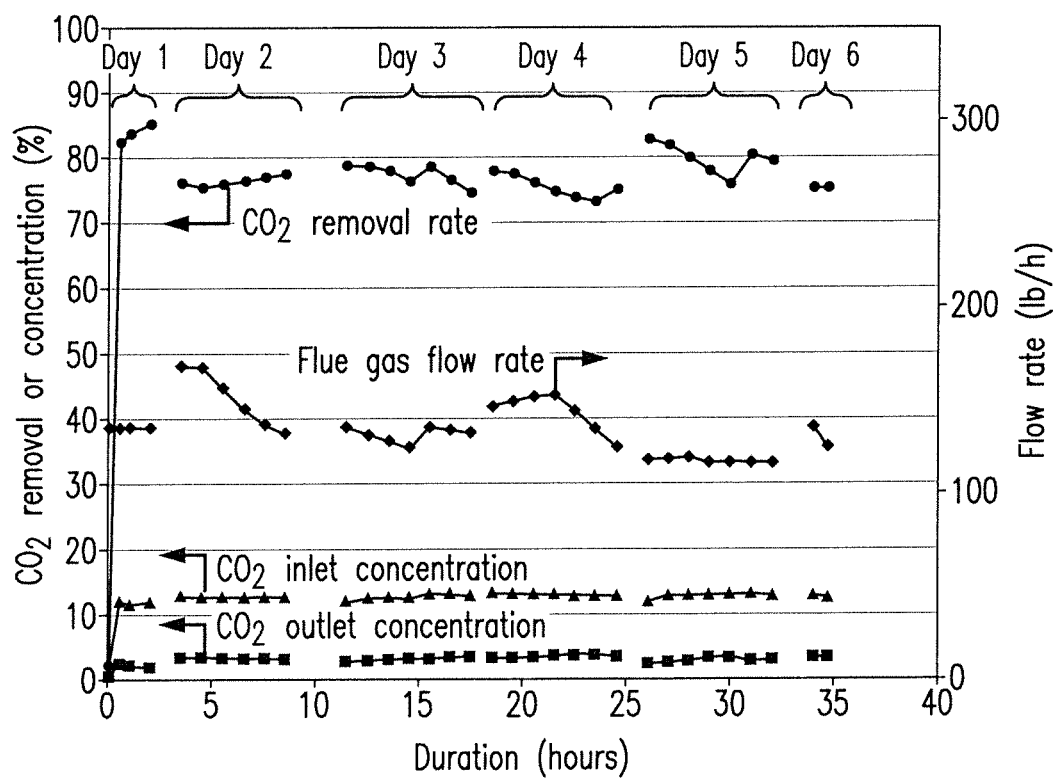
FIG. 4 is a graphical presentation of $CO_2$ removal rate, flue gas flow rate, and $CO_2$ inlet and outlet concentrations as functions of duration for a membrane absorption testing using a 50 wt. % aMDEA solvent.

We have found that liquid side concentration polarization occurs in membrane absorption. Concentration polarization refers to the unexpected high $CO_2$ concentration at the membrane-liquid interface, and thus gradually decreases the mass transfer rate of $CO_2$. FIG. 4 shows a typical solvent-side concentration polarization that we have observed in our testing.

In the subject testing, $CO_2$ capture was performed during the daytime hours (about 8 hours) and $CO_2$ capture rate was monitored. At the end of each day, the system was shut down by 1) shutting off the liquid pump, 2) shutting off the flue gas, and 3) draining out the shell side solvent. This on-off cycle was performed for a couple of days. FIG. 4 shows that for the first data point collected of a day was generally better than the last data point collected on the pervious day. Further, during the operation of each single day, the $CO_2$ removal rate decreased with operation time when the flue gas flow rates were kept constant (as an example, please see data collected on Day 5). This is typically a liquid-side concentration polarization issue, where there is a higher $CO_2$ concentration (relative to the bulk flow stream) in the fluid boundary layer of the liquid side next to the membrane.

Concentration polarization strongly affects the performance of the separation process. First, concentration changes in the solution reduce the driving force within the membrane, hence, the useful flux/rate of separation. Secondly, concentration polarization increases probability of fouling issue, leading to a poor stability of the separation/capture system. Thus, the selectivity of separation and the membrane lifetime are deteriorated.

Generally, to reduce the concentration polarization, flow rate of the solvent should be increased to promote the turbulence. This approach results in better mixing of the solution and in reducing the thickness of the diffusion boundary layer. However, an increase in solvent flow rate increases the L/G ratio of the operation. As a result, the pumping and regeneration costs for the liquid solvent would increase.

Periodically removing the solvent contacted with the membrane surface and replacing with bulk solvent can be another approach to reduce the concentration polarization. However, this approach affects the continuity of the membrane operation.

In the current invention, the viscosity of the solvent is desirably adjusted or otherwise controlled to minimize concentration polarization, and unexpectedly good stability performance was achieved.

Figure 5:
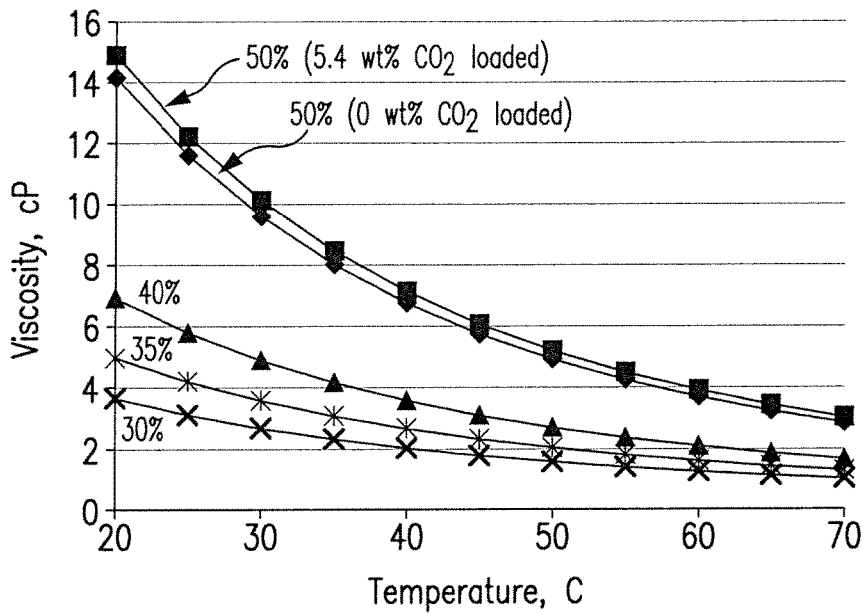
FIG. 5 is a graphical presentation of solvent viscosity as a function of temperature results obtained in testing herein described.

In a portion of our testing, solvent amine concentration was decreased from 50 wt. % to 35 wt. % with the remainder being water. As shown in FIG. 5, the solvent viscosity significantly deceased as the amine concentration decreased from 50 wt. % to 30 wt. %.

Figure 6:
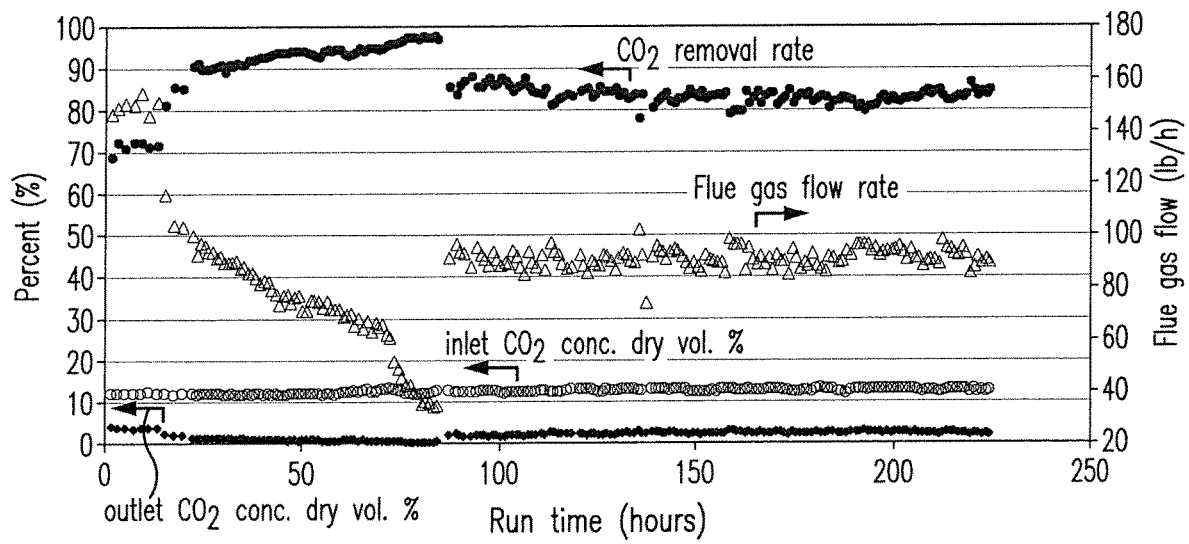
FIG. 6 is a graphical presentation of the run chronology for a single 8-inch diameter module at NCCC for testing herein described.

Continuous testing was performed using the 35 wt. % solvent (i.e., with lower viscosity). During such operation, the $CO_2$ concentration of the flue gas was between 11.7 vol. %-12.7 vol. % (dry basis). The $CO_2$ capture rate increased with decreasing flue gas flow rate as shown in FIG. 6 for the first 83 hours. After 83 hours, the operation conditions including flue gas flow rate were kept fairly constant. Stable performance was achieved. This test confirmed the liquid side concentration polarization issue had been resolved when using low-viscosity solvent.

Figure 7:
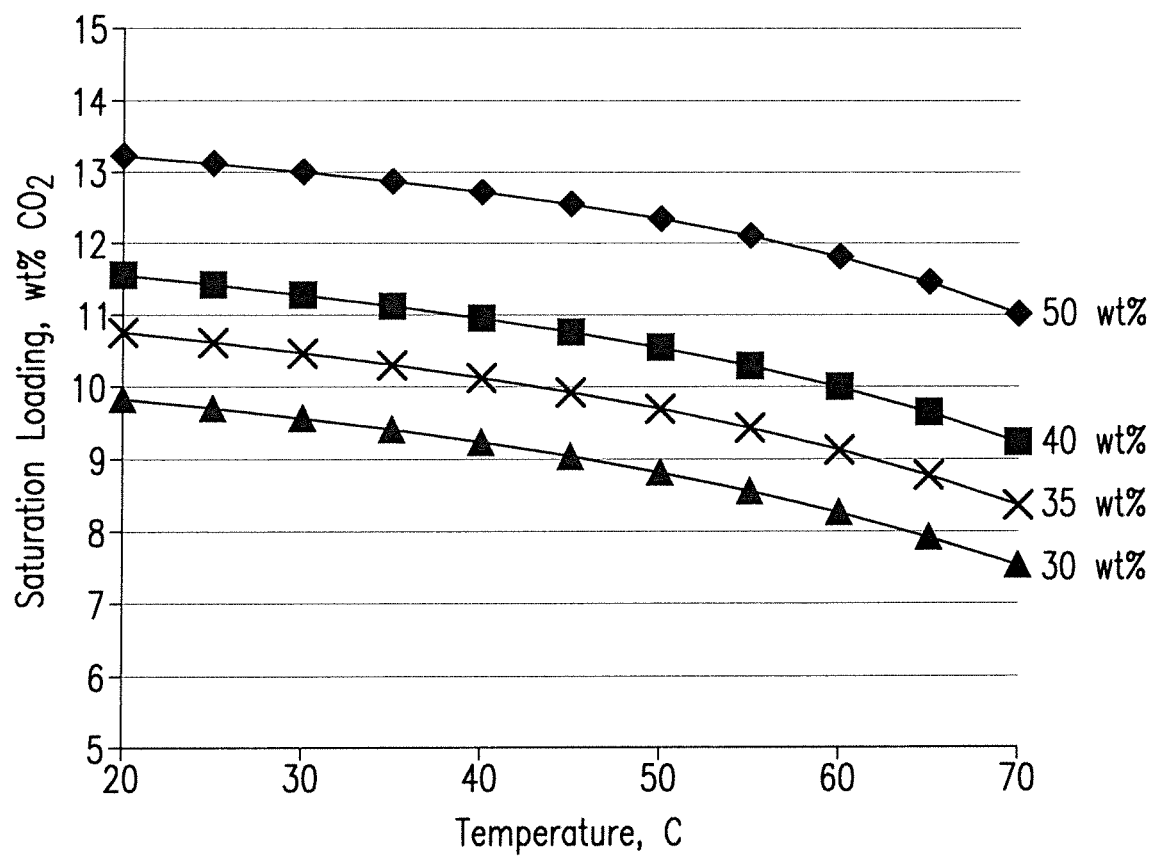
FIG. 7 is a graphical presentation of solvent saturation loading as a function of temperature for testing herein described.

FIG. 7 shows solvent saturation loading decreases with decreasing amine concentration. For treating same amount of $CO_2$ using membrane contactor absorber processing, although the $CO_2$ loading in weight percent of the rich solvent remained unchanged as amine concentration decreases, the $CO_2$ loading in terms of mole $CO_2$ absorbed/mole amine of the rich solvent increases. In other words, the amine strength decreased by about 20% (35 wt. % vs. 50 wt. %), but the concentration polarization was successfully resolved.

While the invention has been described above making specific reference to the capture of $CO_2$ from a flue gas such as generated, produced or otherwise resulting from the operation of a power plant, for example, those skilled in the art and guided by the teachings herein provided will understand and appreciate that the broader application and/or practice of the invention is not necessarily so limited. That is, while the invention may, for example, be applied or used for cost effective capture of $CO_2$ from flue gases, the invention can also have applicability for the removal of other constituents from other materials or streams. For example, the invention can be suitably applied in alternative embodiments for the removal of numerous other gas pollutants such as $NO_x$ and $SO_x$, for the separation of $CO_2$ from hydrogen in refinery streams, and for the separation of $CO_2$ from natural gas (natural gas sweetening). Further, the invention technology can be further utilized in, with or as a generic membrane contactor absorber for the removal of dissolved gases (e.g., $O_2$, $H_2$, etc.) from liquids or for the controlled dissolution of gases (e.g., $O_2$, $H_2$, etc.) in liquids.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

Moreover, those skilled in the art and guided by the teachings herein identified, described or discussed will understand and appreciate that the subject development encompasses a variety of features and is thus capable of manifestation in a variety of specific forms or embodiments and is thus not to be construed as limited to the specific forms or embodiments herein identified or described.

The claims are not intended to include, and should not be interpreted to include, means-plus- or step-plus-function limitations, unless such a limitation is explicitly recited in a given claim using the phrase(s) "means for" or "step for," respectively.

Further, although specific advantages have been enumerated above, various embodiments may include some, none, or all of the enumerated advantages.

The invention illustratively disclosed herein suitably may be practiced in the absence of any element, part, step, component, or ingredient which is not specifically disclosed herein.

What is claimed includes:

1. A process for $CO_2$ capture, the process comprising:

passing a $CO_2$-containing flue gas stream to a membrane contactor absorber containing a membrane element, wherein the $CO_2$-containing gas stream contacts a first side of the membrane element and wherein a $CO_2$ selective solvent is in flow communication with a second side of the membrane element, the second side of the membrane element being opposed to the first side, wherein the $CO_2$ selective solvent has a viscosity between 0.2 and 7 cP and wherein $CO_2$ permeates through the membrane element and is chemically absorbed into the $CO_2$ selective solvent, wherein the $CO_2$ selective solvent has a concentration of less than 40 wt. %, and wherein the $CO_2$-containing flue gas stream passes along the first side of the membrane element at a velocity in a range of 1-30 m/s and the $CO_2$ selective solvent passes along the second side of the membrane element at a velocity in a range of 0.001-0.010 m/s.

2. The process of claim 1 wherein the $CO_2$ chemically absorbed into the $CO_2$ selective solvent forms a $CO_2$-rich solvent and wherein said process additionally comprises:

regenerating the solvent by removing $CO_2$ from the $CO_2$-rich solvent, and recycling the regenerated solvent to the membrane contactor absorber.

3. The process of claim 1 wherein the viscosity is between 1 and 5 cP.

4. The process of claim 1 wherein the membrane element comprises a hollow fiber membrane element having a bore side and an opposed outside.

5. The process of claim 4 wherein the $CO_2$-containing gas stream is passed on the bore side of the hollow fiber membrane element and the $CO_2$ selective solvent is passed on the outside of the hollow fiber membrane element.

6. In a process of operating of a power plant that produces the $CO_2$-containing gas stream, the process of claim 1 wherein the $CO_2$-containing gas stream passed to the membrane contactor absorber comprises the power plant produced $CO_2$-containing gas stream.

7. The process of claim 6 wherein the power plant is a natural gas-fired power plant.

8. The process of claim 6 wherein the power plant is a coal powered power plant.

9. The process of claim 1 wherein the $CO_2$ selective solvent is selected from the group consisting of amines and promoted carbonate solvents.

* * * * *